(12) United States Patent
Locke et al.

(10) Patent No.: US 12,447,053 B2
(45) Date of Patent: Oct. 21, 2025

(54) FLEXIBLE AND CONFORMABLE WOUND DRESSING WITH ENHANCED FLUID ABSORPTION CAPABILITY

(71) Applicant: Solventum Intellectual Properties Company, Maplewood, MN (US)

(72) Inventors: Christopher B. Locke, Bournemouth (GB); Timothy Mark Robinson, Blandford Forum (GB)

(73) Assignee: Solventum Intellectual Properties Company, Maplewood, MN (US)

( * ) Notice: Subject to any disclaimer, the term of this patent is extended or adjusted under 35 U.S.C. 154(b) by 1384 days.

(21) Appl. No.: 16/527,920

(22) Filed: Jul. 31, 2019

(65) Prior Publication Data

US 2020/0038251 A1    Feb. 6, 2020

Related U.S. Application Data

(60) Provisional application No. 62/714,290, filed on Aug. 3, 2018.

(51) Int. Cl.
*A61F 13/0203* (2024.01)
*A61F 13/00* (2024.01)
(Continued)

(52) U.S. Cl.
CPC .... *A61F 13/0223* (2013.01); *A61F 13/00055* (2013.01); *A61F 13/00063* (2013.01);
(Continued)

(58) Field of Classification Search
CPC ........ A61F 13/0223; A61F 2013/00327; A61F 13/00; A61F 13/0209; A61F 13/00042;
(Continued)

(56) References Cited

U.S. PATENT DOCUMENTS 1,355,846 A    10/1920    Rannells
2,547,758 A     4/1951    Keeling
(Continued)

FOREIGN PATENT DOCUMENTS

AU    550575 B2    3/1986
AU    745271 B2    3/2002
(Continued)

OTHER PUBLICATIONS

Louis C. Argenta, MD and Michael J. Morykwas, PHD; Vacuum-Assisted Closure: A New Method for Wound Control and Treatment: Clinical Experience; Annals of Plastic Surgery; vol. 38, No. 6, Jun. 1997; pp. 563-576.

(Continued)

*Primary Examiner* — Sarah Al Hashimi
*Assistant Examiner* — Meagan Ngo (57) ABSTRACT

A wound dressing includes an elastic foam layer, a drape layer, and superabsorbent projections. The elastic foam layer is configured to engage a wound bed and has a first side and a second side, the second side configured to face the wound bed. The drape layer also has a first side and a second side, the second side configured to face the first side of the elastic foam layer. The elastic foam layer also has a plurality of superabsorbent projections (nodules, dots, bumps, lumps, islands, protuberances) fixed to and extending from the first side of the elastic foam layer towards the second side of the drape layer.

17 Claims, 4 Drawing Sheets

(51) Int. Cl.
*A61F 13/02* (2024.01)
*A61F 13/0206* (2024.01)
*A61L 15/22* (2006.01)
*A61L 15/24* (2006.01)
*A61L 15/42* (2006.01)
*A61L 15/44* (2006.01)
*A61L 15/58* (2006.01)
*A61L 15/60* (2006.01)

(52) U.S. Cl.
CPC ...... *A61F 13/0209* (2013.01); *A61F 13/0289* (2013.01); *A61L 15/225* (2013.01); *A61L 15/24* (2013.01); *A61L 15/425* (2013.01); *A61L 15/44* (2013.01); *A61L 15/58* (2013.01); *A61L 15/60* (2013.01)

(58) Field of Classification Search
CPC ...... A61F 2013/00748; A61F 13/00029; A61F 13/01029; A61F 13/01008; A61L 15/60
See application file for complete search history.

(56) References Cited

U.S. PATENT DOCUMENTS

| | | | |
|---|---|---|---|
| 2,632,443 A | 3/1953 | Lesher | |
| 2,682,873 A | 7/1954 | Evans et al. | |
| 2,910,763 A | 11/1959 | Lauterbach | |
| 2,969,057 A | 1/1961 | Simmons | |
| 3,066,672 A | 12/1962 | Crosby, Jr. et al. | |
| 3,367,332 A | 2/1968 | Groves | |
| 3,520,300 A | 7/1970 | Flower, Jr. | |
| 3,568,675 A | 3/1971 | Harvey | |
| 3,648,692 A | 3/1972 | Wheeler | |
| 3,682,180 A | 8/1972 | McFarlane | |
| 3,826,254 A | 7/1974 | Mellor | |
| 4,080,970 A | 3/1978 | Miller | |
| 4,096,853 A | 6/1978 | Weigand | |
| 4,139,004 A | 2/1979 | Gonzalez, Jr. | |
| 4,165,748 A | 8/1979 | Johnson | |
| 4,184,510 A | 1/1980 | Murry et al. | |
| 4,233,969 A | 11/1980 | Lock et al. | |
| 4,245,630 A | 1/1981 | Lloyd et al. | |
| 4,256,109 A | 3/1981 | Nichols | |
| 4,261,363 A | 4/1981 | Russo | |
| 4,275,721 A | 6/1981 | Olson | |
| 4,284,079 A | 8/1981 | Adair | |
| 4,297,995 A | 11/1981 | Golub | |
| 4,333,468 A | 6/1982 | Geist | |
| 4,373,519 A | 2/1983 | Errede et al. | |
| 4,382,441 A | 5/1983 | Svedman | |
| 4,392,853 A | 7/1983 | Muto | |
| 4,392,858 A | 7/1983 | George et al. | |
| 4,419,097 A | 12/1983 | Rowland | |
| 4,465,485 A | 8/1984 | Kashmer et al. | |
| 4,475,909 A | 10/1984 | Eisenberg | |
| 4,480,638 A | 11/1984 | Schmid | |
| 4,525,166 A | 6/1985 | Leclerc | |
| 4,525,374 A | 6/1985 | Vaillancourt | |
| 4,540,412 A | 9/1985 | Van Overloop | |
| 4,543,100 A | 9/1985 | Brodsky | |
| 4,548,202 A | 10/1985 | Duncan | |
| 4,551,139 A | 11/1985 | Plaas et al. | |
| 4,569,348 A | 2/1986 | Hasslinger | |
| 4,605,399 A | 8/1986 | Weston et al. | |
| 4,608,041 A | 8/1986 | Nielsen | |
| 4,640,688 A | 2/1987 | Hauser | |
| 4,655,754 A | 4/1987 | Richmond et al. | |
| 4,664,662 A | 5/1987 | Webster | |
| 4,710,165 A | 12/1987 | McNeil et al. | |
| 4,733,659 A | 3/1988 | Edenbaum et al. | |
| 4,743,232 A | 5/1988 | Kruger | |
| 4,758,220 A | 7/1988 | Sundblom et al. | |
| 4,787,888 A | 11/1988 | Fox | |
| 4,826,494 A | 5/1989 | Richmond et al. | |
| 4,838,883 A | 6/1989 | Matsuura | |
| 4,840,187 A | 6/1989 | Brazier | |
| 4,863,449 A | 9/1989 | Therriault et al. | |
| 4,872,450 A | 10/1989 | Austad | |
| 4,878,901 A | 11/1989 | Sachse | |
| 4,897,081 A | 1/1990 | Poirier et al. | |
| 4,906,233 A | 3/1990 | Moriuchi et al. | |
| 4,906,240 A | 3/1990 | Reed et al. | |
| 4,919,654 A | 4/1990 | Kalt | |
| 4,941,882 A | 7/1990 | Ward et al. | |
| 4,953,565 A | 9/1990 | Tachibana et al. | |
| 4,969,880 A | 11/1990 | Zamierowski | |
| 4,985,019 A | 1/1991 | Michelson | |
| 5,037,397 A | 8/1991 | Kalt et al. | |
| 5,086,170 A | 2/1992 | Luheshi et al. | |
| 5,092,858 A | 3/1992 | Benson et al. | |
| 5,100,396 A | 3/1992 | Zamierowski | |
| 5,134,994 A | 8/1992 | Say | |
| 5,149,331 A | 9/1992 | Ferdman et al. | |
| 5,167,613 A | 12/1992 | Karami et al. | |
| 5,176,663 A | 1/1993 | Svedman et al. | |
| 5,215,522 A | 6/1993 | Page et al. | |
| 5,232,453 A | 8/1993 | Plass et al. | |
| 5,261,893 A | 11/1993 | Zamierowski | |
| 5,278,100 A | 1/1994 | Doan et al. | |
| 5,279,550 A | 1/1994 | Habib et al. | |
| 5,298,015 A | 3/1994 | Komatsuzaki et al. | |
| 5,342,376 A | 8/1994 | Ruff | |
| 5,344,415 A | 9/1994 | DeBusk et al. | |
| 5,358,494 A | 10/1994 | Svedman | |
| 5,437,622 A | 8/1995 | Carion | |
| 5,437,651 A | 8/1995 | Todd et al. | |
| 5,527,293 A | 6/1996 | Zamierowski | |
| 5,549,584 A | 8/1996 | Gross | |
| 5,556,375 A | 9/1996 | Ewall | |
| 5,607,388 A | 3/1997 | Ewall | |
| 5,636,643 A | 6/1997 | Argenta et al. | |
| 5,645,081 A | 7/1997 | Argenta et al. | |
| 5,763,331 A * | 6/1998 | Demhartner | A61F 13/539 604/366 |
| 5,782,787 A * | 7/1998 | Webster | A61F 13/023 602/56 |
| 6,071,267 A | 6/2000 | Zamierowski | |
| 6,135,116 A | 10/2000 | Vogel et al. | |
| 6,241,747 B1 | 6/2001 | Ruff | |
| 6,287,316 B1 | 9/2001 | Agarwal et al. | |
| 6,345,623 B1 | 2/2002 | Heaton et al. | |
| 6,488,643 B1 | 12/2002 | Tumey et al. | |
| 6,493,568 B1 | 12/2002 | Bell et al. | |
| 6,553,998 B2 | 4/2003 | Heaton et al. | |
| 6,814,079 B2 | 11/2004 | Heaton et al. | |
| 2002/0077661 A1 | 6/2002 | Saadat | |
| 2002/0115951 A1 | 8/2002 | Norstrem et al. | |
| 2002/0120185 A1 | 8/2002 | Johnson | |
| 2002/0143286 A1 | 10/2002 | Tumey | |
| 2004/0127839 A1 * | 7/2004 | Sigurjonsson | A61F 13/0276 602/55 |
| 2008/0255493 A1 * | 10/2008 | Sigurjonsson | A61L 15/34 602/44 |
| 2010/0030171 A1 * | 2/2010 | Canada | A61F 13/0223 604/378 |
| 2011/0230848 A1 * | 9/2011 | Manwaring | A61F 13/00063 604/290 |
| 2011/0270206 A1 * | 11/2011 | Jensen | A61F 13/022 604/369 |
| 2019/0274889 A1 * | 9/2019 | Steward | A61F 13/00038 |

FOREIGN PATENT DOCUMENTS

| | | |
|---|---|---|
| AU | 755496 B2 | 12/2002 |
| CA | 2005436 A1 | 6/1990 |
| DE | 26 40 413 A1 | 3/1978 |
| DE | 43 06 478 A1 | 9/1994 |
| DE | 29 504 378 U1 | 9/1995 |
| EP | 0100148 A1 | 2/1984 |
| EP | 0117632 A2 | 9/1984 |
| EP | 0161865 A2 | 11/1985 |
| EP | 0358302 A2 | 3/1990 |
| EP | 1018967 A1 | 7/2000 |

(56) References Cited

FOREIGN PATENT DOCUMENTS

| EP | 2 189 139 A2 | 5/2010 |
|---|---|---|
| GB | 692578 A | 6/1953 |
| GB | 2 195 255 A | 4/1988 |
| GB | 2 197 789 A | 6/1988 |
| GB | 2 220 357 A | 1/1990 |
| GB | 2 235 877 A | 3/1991 |
| GB | 2 329 127 A | 3/1999 |
| GB | 2 333 965 A | 8/1999 |
| JP | 4129536 B2 | 8/2008 |
| SG | 71559 | 4/2002 |
| WO | 80/02182 A1 | 10/1980 |
| WO | 87/04626 A1 | 8/1987 |
| WO | 90/010424 A1 | 9/1990 |
| WO | 93/009727 A1 | 5/1993 |
| WO | 94/020041 A1 | 9/1994 |
| WO | 96/05873 A1 | 2/1996 |
| WO | 97/18007 A1 | 5/1997 |
| WO | 99/13793 A1 | 3/1999 |
| WO | WO-2007/092350 A1 | 8/2007 |
| WO | WO-2010/135645 A2 | 11/2010 |
| WO | WO-2013/074825 A1 | 5/2013 |
| WO | WO-2018/226592 A1 | 12/2018 |

OTHER PUBLICATIONS

Susan Mendez-Eatmen, RN; "When wounds Won't Heal" RN Jan. 1998, vol. 61 (1); Medical Economics Company, Inc., Montvale, NJ, USA; pp. 20-24.

James H. Blackburn II, MD et al.: Negative-Pressure Dressings as a Bolster for Skin Grafts; Annals of Plastic Surgery, vol. 40, No. 5, May 1998, pp. 453-457; Lippincott Williams & Wilkins, Inc., Philidelphia, PA, USA.

John Masters; "Reliable, Inexpensive and Simple Suction Dressings"; Letter to the Editor, British Journal of Plastic Surgery, 1998, vol. 51 (3), p. 267; Elsevier Science/The British Association of Plastic Surgeons, UK.

S.E. Greer, et al. "The Use of Subatmospheric Pressure Dressing Therapy to Close Lymphocutaneous Fistulas of the Groin" British Journal of Plastic Surgery (2000), 53, pp. 484-487.

George V. Letsou, MD., et al; "Stimulation of Adenylate Cyclase Activity in Cultured Endothelial Cells Subjected to Cyclic Stretch"; Journal of Cardiovascular Surgery, 31, 1990, pp. 634-639.

Orringer, Jay, et al; "Management of Wounds in Patients with Complex Enterocutaneous Fistulas"; Surgery, Gynecology & Obstetrics, Jul. 1987, vol. 165, pp. 79-80.

International Search Report for PCT International Application PCT/GB95/01983; Nov. 23, 1995.

PCT International Search Report for PCT International Application PCT/GB98/02713; Jan. 8, 1999.

PCT Written Opinion; PCT International Application PCT/GB98/02713; Jun. 8, 1999.

PCT International Examination and Search Report, PCT International Application PCT/GB96/02802; Jan. 15, 1998 & Apr. 29, 1997.

PCT Written Opinion, PCT International Application PCT/GB96/02802; Sep. 3, 1997.

Dattilo, Philip P., Jr., et al; "Medical Textiles: Application of an Absorbable Barbed Bi-directional Surgical Suture"; Journal of Textile and Apparel, Technology and Management, vol. 2, Issue 2, Spring 2002, pp. 1-5.

Kostyuchenok, B.M., et al; "Vacuum Treatment in the Surgical Management of Purulent Wounds"; Vestnik Khirurgi, Sep. 1986, pp. 18-21 and 6 page English translation thereof.

Davydov, Yu. A., et al; "Vacuum Therapy in the Treatment of Purulent Lactation Mastitis"; Vestnik Khirurgi, May 14, 1986, pp. 66-70, and 9 page English translation thereof.

Yusupov. Yu.N., et al; "Active Wound Drainage", Vestnki Khirurgi, vol. 138, Issue 4, 1987, and 7 page English translation thereof.

Davydov, Yu.A., et al; "Bacteriological and Cytological Assessment of Vacuum Therapy for Purulent Wounds"; Vestnik Khirugi, Oct. 1988, pp. 48-52, and 8 page English translation thereof.

Davydov, Yu.A., et al; "Concepts for the Clinical-Biological Management of the Wound Process in the Treatment of Purulent Wounds by Means of Vacuum Therapy"; Vestnik Khirurgi, Jul. 7, 1980, pp. 132-136, and 8 page English translation thereof.

Chariker, Mark E., M.D., et al; "Effective Management of incisional and cutaneous fistulae with closed suction wound drainage"; Contemporary Surgery, vol. 34, Jun. 1989, pp. 59-63.

Egnell Minor, Instruction Book, First Edition, 300 7502, Feb. 1975, pp. 24.

Egnell Minor: Addition to the Users Manual Concerning Overflow Protection—Concerns all Egnell Pumps, Feb. 3, 1983, pp. 2.

Svedman, P.: "Irrigation Treatment of Leg Ulcers", The Lancet, Sep. 3, 1983, pp. 532-534.

Chinn, Steven D. et al.: "Closed Wound Suction Drainage", The Journal of Foot Surgery, vol. 24, No. 1, 1985, pp. 76-81.

Arnljots, Björn et al.: "Irrigation Treatment in Split-Thickness Skin Grafting of Intractable Leg Ulcers", Scand J. Plast Reconstr. Surg., No. 19, 1985, pp. 211-213.

Svedman, P.: "A Dressing Allowing Continuous Treatment of a Biosurface", IRCS Medical Science: Biomedical Technology, Clinical Medicine, Surgery and Transplantation, vol. 7, 1979, p. 221.

Svedman, P. et al: "A Dressing System Providing Fluid Supply and Suction Drainage Used for Continuous of Intermittent Irrigation", Annals of Plastic Surgery, vol. 17, No. 2, Aug. 1986, pp. 125-133.

N.A. Bagautdinov, "Variant of External Vacuum Aspiration in the Treatment of Purulent Diseases of Soft Tissues," Current Problems in Modern Clinical Surgery: Interdepartmental Collection, edited by V. Ye Volkov et al. (Chuvashia State University, Cheboksary, U.S.S.R. 1986); pp. 94-96 (certified translation).

K.F. Jeter, T.E. Tintle, and M. Chariker, "Managing Draining Wounds and Fistulae: New and Established Methods," Chronic Wound Care, edited by D. Krasner (Health Management Publications, Inc., King of Prussia, PA 1990), pp. 240-246.

G. Živadinovi?, V. ? uki?, Ž. Maksimovi?, ?. Radak, and p. Peška, "Vacuum Therapy in the Treatment of Peripheral Blood Vessels," Timok Medical Journal 11 (1986), pp. 161-164 (certified translation).

F.E. Johnson, "An Improved Technique for Skin Graft Placement Using a Suction Drain," Surgery, Gynecology, and Obstetrics 159 (1984), pp. 584-585.

A.A. Safronov, Dissertation Abstract, Vacuum Therapy of Trophic Ulcers of the Lower Leg with Simultaneous Autoplasty of the Skin (Central Scientific Research Institute of Traumatology and Orthopedics, Moscow, U.S.S.R. 1967) (certified translation).

M. Schein, R. Saadia, J.R. Jamieson, and G.A.G. Decker, "The 'Sandwich Technique' in the Management of the Open Abdomen," British Journal of Surgery 73 (1986), pp. 369-370.

D.E. Tribble, An Improved Sump Drain-Irrigation Device of Simple Construction, Archives of Surgery 105 (1972) pp. 511-513.

M.J. Morykwas, L.C. Argenta, E.I. Shelton-Brown, and W. McGuirt, "Vacuum-Assisted Closure: A New Method for Wound Control and Treatment: Animal Studies and Basic Foundation," Annals of Plastic Surgery 38 (1997), pp. 553-562 (Morykwas I).

C.E. Tennants, "The Use of Hypermia in the Postoperative Treatment of Lesions of the Extremities and Thorax," Journal of the American Medical Association 64 (1915), pp. 1548-1549.

Selections from W. Meyer and V. Schmieden, Bier's Hyperemic Treatment in Surgery, Medicine, and the Specialties: A Manual of Its Practical Application, (W.B. Saunders Co., Philadelphia, PA 1909), pp. 17-25, 44-64, 90-96, 167-170, and 210-211.

V.A. Solovev et al., Guidelines, The Method of Treatment of Immature External Fistulas in the Upper Gastrointestinal Tract, editor-in-chief Prov. V.I. Parahonyak (S.M. Kirov Gorky State Medical Institute, Gorky, U.S.S.R. 1987) ("Solovev Guidelines").

V.A. Kuznetsov & N.a. Bagautdinov, "Vacuum and Vacuum-Sorption Treatment of Open Septic Wounds," in II All-Union Conference on Wounds and Wound Infections: Presentation Abstracts, edited by B.M. Kostyuchenok et al. (Moscow, U.S.S.R. Oct. 28-29, 1986) pp. 91-92 ("Bagautdinov II").

(56) References Cited

OTHER PUBLICATIONS

V.A. Solovev, Dissertation Abstract, Treatment and Prevention of Suture Failures after Gastric Resection (S.M. Kirov Gorky State Medical Institute, Gorky, U.S.S.R. 1988) ("Solovev Abstract").
V.A.C.® Therapy Clinical Guidelines: A Reference Source for Clinicians; Jul. 2007.
International Search Report and Written Opinion in International Application No. PCT/US2019/044392, mailed on Oct. 24, 2019.

* cited by examiner

FLEXIBLE AND CONFORMABLE WOUND DRESSING WITH ENHANCED FLUID ABSORPTION CAPABILITY

CROSS-REFERENCE TO RELATED APPLICATIONS

This application claims the benefit of priority to U.S. Provisional Application No. 62/714,290, filed on Aug. 3, 2018, which is incorporated herein by reference in its entirety.

BACKGROUND

The present disclosure relates generally to a wound dressing. The present disclosure relates more particularly to a wound dressing having a hydrophilic elastic foam layer and a drape layer, wherein the elastic foam layer is placed on the wound bed and includes a plurality of superabsorbent projections extending towards the drape layer.

It is often desirable to remove fluid from a wound bed to promote the healing of the wound. In some cases, wound dressings include a layer of foam configured to absorb the fluid from the wound bed. However, the absorption capacity of the wound dressing is often times quite low, such that not all of the wound fluid is absorbed into the wound dressing. There is often no consistent way to indicate when the wound dressing has reached its fluid absorption capacity, so often times a caregiver may not replace the wound dressing as often as desired, or the caregiver may replace the wound dressing too frequently which may retard the healing process, cause additional damage to the wound bed, or cause pain to the patient. Additionally, the dressings often release the absorbed fluid upon removal of the dressing back into the wound bed. The foam layer of the wound dressing may be inadequate in retaining the absorbed wound fluid.

Additionally, it is often desirable to have a flexible and conformable wound dressing, such that the dressing can withstand the movement of the patient. However, increasing the absorption of a wound dressing by increasing the size or quantity of the foam layers or superabsorbent sheet often results in a wound dressing that is stiff and unconformable to the patient. Therefore, a compromise is often made as to how absorptive a dressing can be made while still retaining some flexibility of the wound dressing. It is therefore desirable to provide a highly flexible and conformable foam dressing that absorbs and retains high quantities of fluids.

SUMMARY

One implementation of the present disclosure is a wound dressing including an elastic foam layer, a drape layer, and a plurality of superabsorbent projections. The elastic foam layer is configured to engage a wound bed and has a first side and a second side, wherein the second side is configured to face the wound bed. The drape layer has a first side and a second side, wherein the second side is configured to face the first side of the elastic foam layer. The superabsorbent projections (nodules, dots, bumps, lumps, islands, protuberances) are fixed to the first side of the elastic foam layer, and extend towards the second side of the drape layer.

Another implementation of the present disclosure is a method of making a wound dressing. The method includes providing a hydrophilic foam layer configured to engage a wound bed, which has a first side and a second side, the second side configured to face the wound bed. The method further includes preparing a slurry comprising a superabsorbent material. The method further includes applying the slurry onto the first side of the hydrophilic foam layer in the form of a plurality of non-contiguous deposits. The method further includes providing a fusible layer atop the deposits and the first side of the hydrophilic foam layer. Finally, the method includes providing a drape layer having a high moisture vapor transmission atop the fusible fiber.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Referring generally to FIGS. 1-6, a wound dressing is shown, according to exemplary embodiments. The wound dressing of the exemplary embodiments has multiple layers including an elastic foam layer and a drape layer. The elastic foam layer includes a plurality of non-contiguous superabsorbent projections (e.g., segments, patches, islands, etc.) configured to draw a wound exudate fluid through the elastic foam layer. In some embodiments, the drape layer is laminated with a fusible fiber to the elastic foam layer.

Advantageously, the superabsorbent projections of the elastic foam layer increase the absorptivity of the wound dressing while retaining flexibility. In some embodiments, the superabsorbent projections comprise a plurality of nodules, dots, bumps, lumps, islands, and protuberances extending from the elastic foam layer towards the drape layer. The superabsorbent projections increase the absorption of the wound dressing to wick wound fluid exudate from the periwound, through the elastic foam layer, and towards the drape layer. The ordering of the elastic foam layer, the superabsorbent projections, and the drape layer are configured to establish a relative hydrophilic gradient from the wound bed to the atmosphere through the dressing, as the elastic foam layer is the most hydrophobic and the drape layer is the most hydrophilic.

Another advantage provided by the wound dressing of the present disclosure is an indication of when the wound dressing has reached its absorption capacity of wound fluid exudate. In some embodiments, the superabsorbent projections are configured to swell upon absorbing the wound exudate fluid, which provides a visual indication of which portion of the wound dressing has absorbed wound exudate and/or when the wound dressing absorbed a maximum capacity of wound exudate. This is intended to prevent unnecessary changing of the wound dressing and provides an indication to a caregiver as to when a wound dressing should be replaced. Additional features and advantages of the wound dressing are described in detail below.

Wound Dressing

Figure 1:
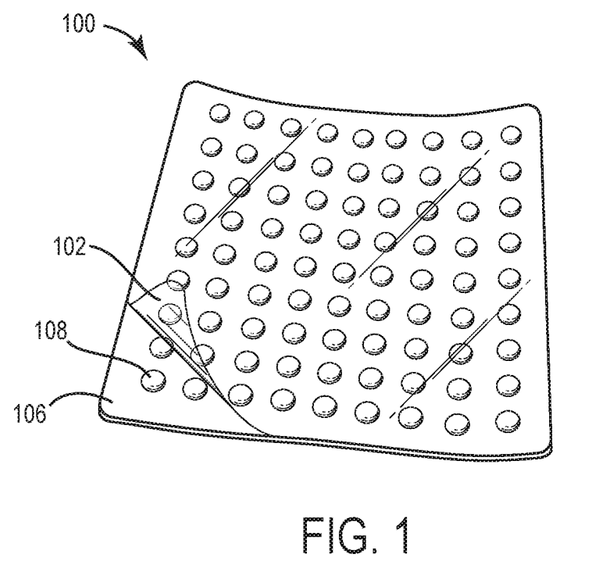
FIG. 1 is a top view of a wound dressing, according to an exemplary embodiment.
Figure 2:
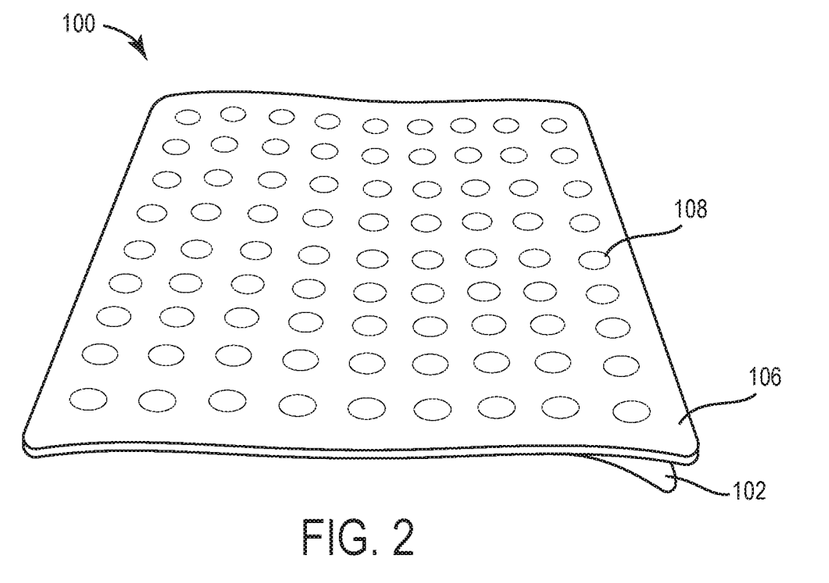
FIG. 2 is a bottom view of the wound dressing of FIG. 1, according to an exemplary embodiment.
Figure 3:
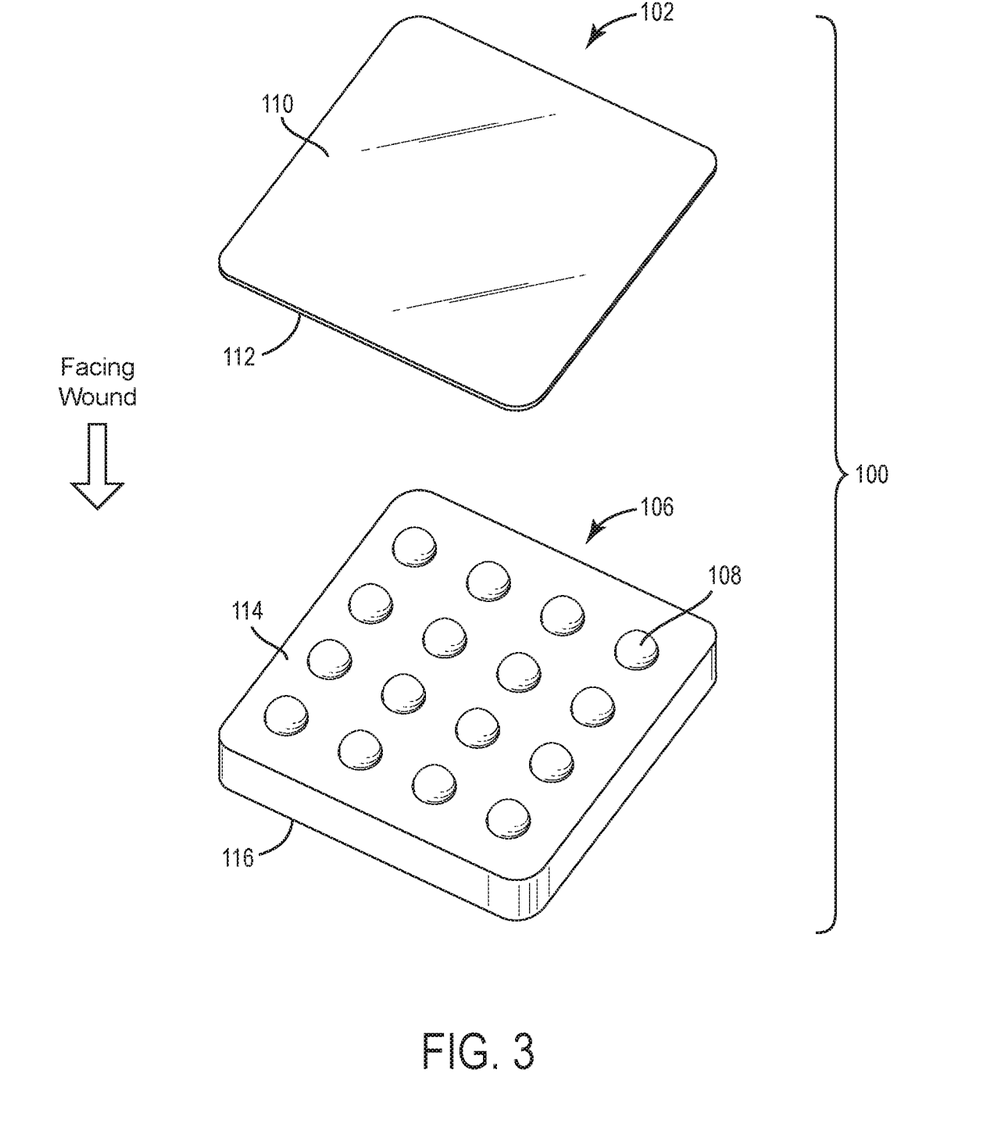
FIG. 3 is an exploded view illustrating several layers of the wound dressing of FIGS. 1 and 2, according to an exemplary embodiment.
Figure 4:
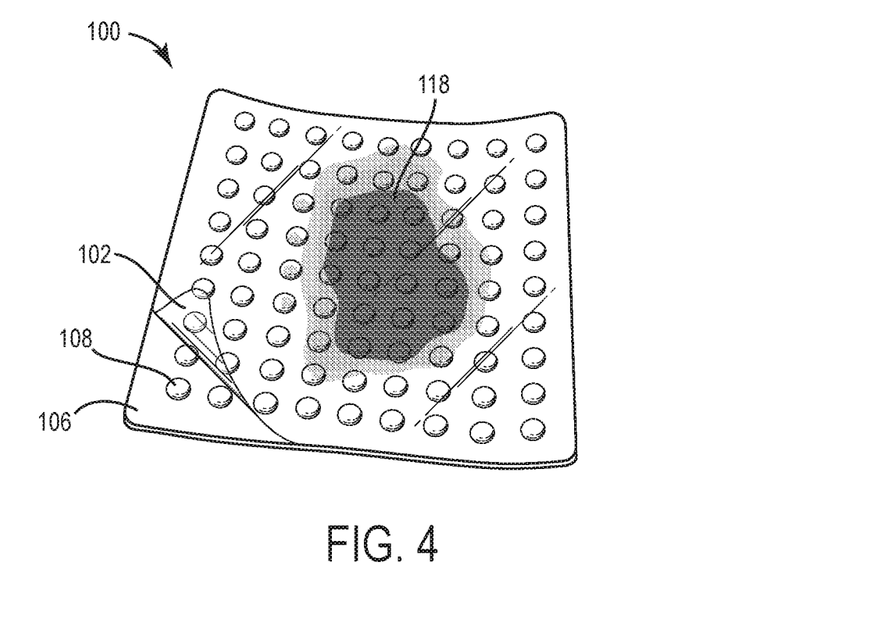
FIG. 4 is a top view of the wound dressing of FIG. 1 with fluid absorption, according to an exemplary embodiment.
Figure 5:
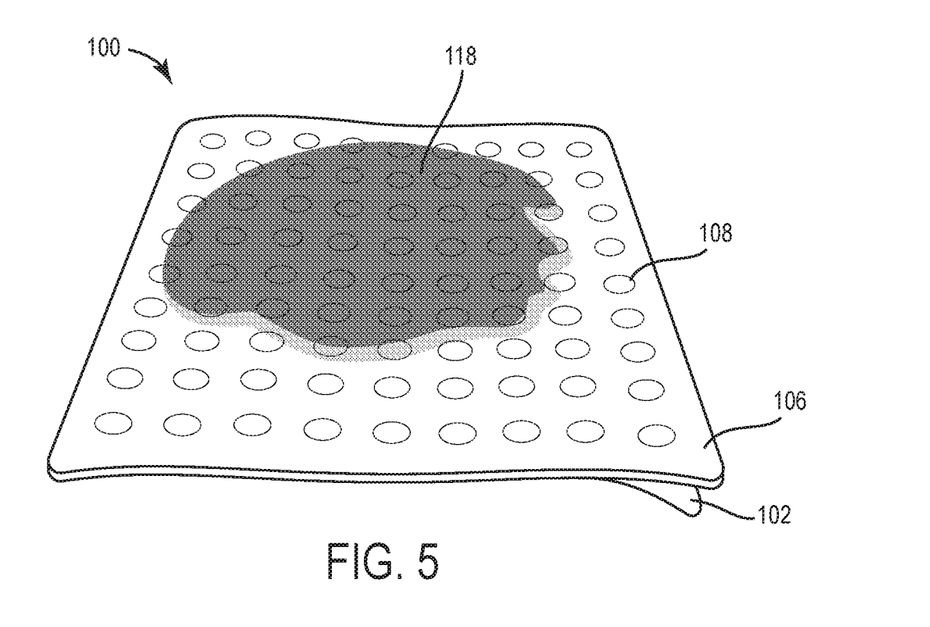
FIG. 5 is a bottom view of the wound dressing of FIG. 1 with fluid absorption, according to an exemplary embodiment.
Figure 6:
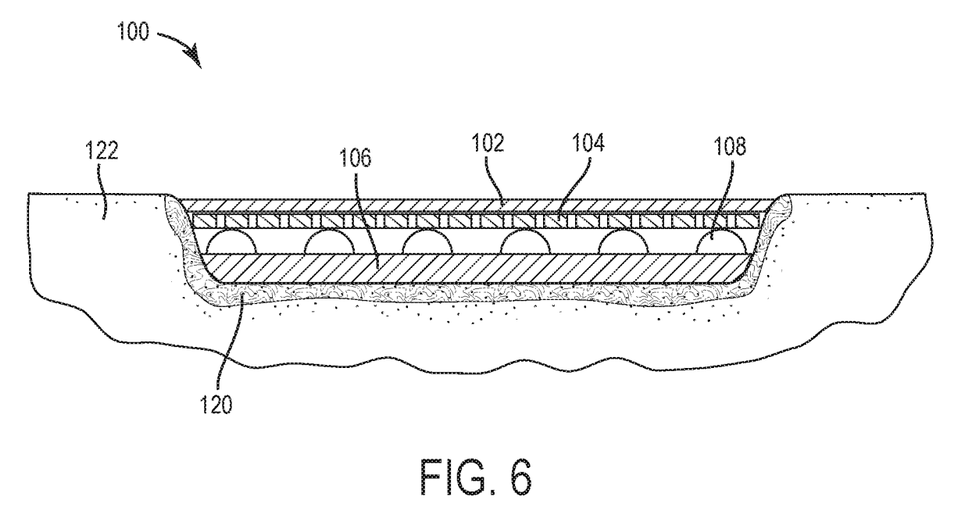
FIG. 6 is a cross-sectional view of a wound dressing adhered to a surface, according to an exemplary embodiment.

Referring now FIGS. 1-6, a wound dressing 100 is shown, according to an exemplary embodiment. In a brief overview, FIG. 1 is a top view of a wound dressing 100 as would be visible when wound dressing 100 is adhered to a surface (e.g., a patient's skin). FIG. 2 is a bottom view of wound dressing 100 showing surface of wound dressing 100 configured to contact a wound. FIG. 3 is an exploded view illustrating several components and layers 102-108 of wound dressing 100. FIG. 4 is a top view of the wound dressing 100 upon application of a fluid to the wound dressing 100. FIG. 5 is a bottom view of the wound dressing 100 upon the application of the fluid to the wound dressing 100. FIG. 6 illustrates one embodiment of a cross-sectional view of wound dressing 100 adhered to a patient at a wound bed 120.

In various embodiments, wound dressing 100 can be formed as a substantially flat sheet for topical application to wounds, or formed as a contoured dressing for application to body surfaces having high curvature. The size and shape of wound dressing 100 can vary depending on the size of the wound to be dressed and its location. For example, it is contemplated that the size of wound dressing 100 can range from approximately 1 $cm^2$ to 200 $cm^2$, and more preferably from approximately 4 $cm^2$ to 100 $cm^2$. However, other shapes and sizes of wound dressing 100 are also possible depending on the intended use. In other embodiments, wound dressing 100 may have a substantially convex or concave shape, or other customizable topography to adhere to wounds located on areas such as the knee or elbow.

Wound dressing 100 is shown to include (among other possible layers) a drape layer 102, an elastic foam layer 106, and a plurality of superabsorbent projections 108. In some embodiments, the drape layer 102 and elastic foam layer 105 are bonded to each other (e.g., laminated together using a fusible fiber 104). In the embodiment shown in FIG. 6, wound dressing 100 is applied for use at a wound bed 120, with the drape layer 102 and the elastic foam layer 106 entirely within the confines of the periwound 122. In other embodiments, the drape layer 102 may extend past a perimeter of the elastic foam layer 106 and adhering to the top of the periwound 122. However, other configurations of the locations of the layers are also possible depending on the intended use, such as the extension of layers into the periwound 122 or the surrounding wound bed 120.

Drape Layer

In some embodiments, wound dressing 100 includes a drape layer 102. Drape layer 102 is shown to include a first side 110 and a second side 112 opposite first side 110. Second side 112 is configured to face a wound. When wound dressing 100 is applied to a wound, first side 110 faces away from the wound whereas second side 112 faces towards the wound. Drape layer attaches over elastic foam layer 106. In some embodiments, drape layer 102 is laminated to elastic foam layer 106 using a fusible fiber 104 positioned between drape layer 102 and elastic foam layer 106. Drape layer 102 can be bonded to elastic foam layer 106, for example, by an adhesive or by radiation cross-linking. In some embodiments, drape layer 102 is bonded to the elastic foam layer 106 by urethane or urea linkages. This can be achieved by applying drape layer 102 to elastic foam layer 106 (substantially without mixing) before polyurethane curing is complete.

In some embodiments, drape layer 102 is a thin layer of polyurethane film. One example of a suitable material for drape layer 102 is the polyurethane film known as ESTANE 5714F. Other suitable polymers for forming drape layer 102 include poly alkoxylalkyl acrylates and methacrylates, such as those described in Great Britain Patent Application No. 1280631A filed Nov. 22, 2002, the entire disclosure of which is incorporated by reference herein. In some embodiments, drape layer 102 includes a continuous layer of a high-density blocked polyurethane foam that is predominantly closed-cell. Drape layer 102 may have a thickness in the range of 10 μm to 100 μm, preferably in the range of 50 μm to 70 μm. In some embodiments, drape layer 102 has a thickness of approximately 60 μm.

Drape layer 102 may be substantially permeable to liquid and moisture vapor. In other words, drape layer 102 may be permeable to both water vapor and liquid water such as wound exudate. Such permeability is intended to facilitate or enhance a hydrophilic gradient from the wound bed 120, through the wound dressing 100, and to the surrounding atmosphere. In some embodiments, drape layer 102 is impermeable to bacteria and other microorganisms. In other embodiments, drape layer 102 is configured to wick moisture from elastic foam layer 106 and superabsorbent projections 108 to first side 110 of drape layer 102, such that it may evaporate into the atmosphere. In some embodiments, drape layer 102 may be substantially hydrophilic and have a high moisture vapor transmission rate, such as to permit evaporation of would exudate/fluid from first side 110 of drape layer 102.

In some embodiments, drape layer 102 is substantially free of adhesives, such as second side 112 of drape layer 102 is not adhered to elastic foam layer 106. Rather, drape layer 102 is laminated to elastic foam layer 106 using a fusible fiber 104 positioned between drape layer 102 and elastic foam layer 108. In the embodiment shown, the perimeter of drape layer 102 is even with the perimeter of elastic foam layer 106. In other embodiments, the perimeter of drape layer 102 may extend beyond (e.g., circumscribe) the perimeter elastic foam layer to provide a margin for wound dressing 100 (e.g., as an "island" dressing) to the skin of a patient adjacent to the wound being treated, and may comprises an adhesive on the second side 112 configured to attach to the wound.

In some embodiments, second side 112 of drape layer 102 contacts first side 114 of elastic foam layer 106. Second side 112 of drape layer 102 may simply contact first side 114 of elastic foam layer 106 without the use of an adhesive or may be laminated by fusible fiber 104 to first side 112 of elastic foam layer 106. Second side 112 of drape layer 102 may also contact, in various locations, superabsorbent projections 108. In some embodiments, the imprints made by superabsorbent projections 108 may be seen on first side 110 of drape layer 102, such that first side 110 of drape layer 102 has a plurality of bumps.

Elastic Foam Layer

In some embodiments, wound dressing 100 includes an elastic foam layer 106. Elastic foam layer 106 is shown to include a first side 114 and a second side 116 opposite the first side 114. Second side 116 is configured to face and contact the wound. When wound dressing 100 is applied to a wound, first side 114 faces away from the wound whereas second side 116 faces towards the wound. In some embodiments, first side 114 of elastic foam layer 106 contacts second side 112 of drape layer 102. In some embodiments, first side 114 of elastic foam layer 106 is laminated via fusible fiber 104 to second side 112 of drape layer 102. Alternatively, first side 114 of elastic foam layer 106 may be in contact with second side 112 of drape layer 102 without the use of adhesive.

Elastic foam layer 106 may comprise a polyurethane foam or a polyethylene foam. In some embodiments, elastic foam layer 106 includes a flexible plasticized hydrophilic polymer matrix having an internal cellular structure. Several examples of hydrophilic foams which can be used to make elastic foam layer 106 are described in detail in U.S. Pat. No. 8,097,272 issued Jan. 17, 2012, U.S. Pat. No. 8,664,464 issued Mar. 4, 2014, and U.S. Pat. No. 8,058,499 issued Nov. 15, 2011. The entire disclosure of each of these patents is incorporated by reference herein. In other embodiments, elastic foam layer 106 may be formed from aromatic or aliphatic precursors. Advantageously, elastic foam layer 106 may provide enhanced absorbency for liquid exudate. This is because the porous structure of the foam provides for rapid uptake of liquid exudate.

In some embodiments, elastic foam layer 106 includes an antimicrobial agent or other active agents to promote effective wound healing. Non-limiting examples of such active materials may include antimicrobial silver, silver oxidized regenerated cellulose (ORC) (e.g., approximately 25 wt % ionically bonded silver), polyhexamethylene biguanide (PHMB), nosteroidal anti-inflammatory drugs such as acetaminophen, steroids, anti-inflammatory cytokines, anesthetics, antimicrobial agents such as penicillin or streptomycin, antiseptics such as chlorhexidine, growth factors such as fibroblast growth factor (FGF), a platelet derived growth factor (PDGF), or an epidermal growth factor (EGF), and other therapeutic agents, individually or in any combination. If present, such active materials may typically be included at any effective level that show therapeutic efficacy, while preferably not being at such a high level as to significantly counteract any critical or desired physical, chemical, or biological property of the wound dressing 100. Depending upon the therapeutic goal, any active material may be loaded at a level of from about 10 wppm to about 10 wt % of the layer in which it is present, for example, from about 50 wppm to about 5 wt % or from about 100 wppm to about 1 wt %. The active material may be contained within a thin film on second side 116 of elastic foam layer 106 or may be distributed within elastic foam layer 106.

Elastic foam layer 106 is shown to include a plurality of superabsorbent projections 108 distributed on the first side 114. In the embodiments shown, superabsorbent projections 108 are substantially evenly distributed along first side 114 of elastic foam layer 106. In other embodiments, superabsorbent projections may be distributed in a non-uniform pattern on first side 114 of elastic foam layer 106. In some embodiments, superabsorbent projections 108 may comprise one or more of nodules, dots, bumps, lumps, islands, protuberances on first side 114 of elastic foam layer 106. Superabsorbent projections 108 may be formed in a range of shapes such as squares, hexagons, hoops, stars, crosses, or a range of lines.

Second side 116 of elastic foam layer 106 is shown to contact wound bed 120. In the embodiment shown in FIG. 6, elastic foam layer 106 and drape layer 102 lie entirely within the confines of the periwound 120. In other embodiments, drape layer 102 may extend past elastic foam layer 106 and may adhere to a top surface of the periwound 120.

Superabsorbent Projections

In some embodiments, wound dressing 100 includes a plurality of superabsorbent projections 108 extending from the first side 114 of elastic foam layer 106. A top portion of superabsorbent projections 108 contacts second side 112 of drape layer 102. In some embodiments, superabsorbent projections 108 comprise a plurality of nodules, dots, bumps, lumps, islands, or protuberances.

In some embodiments, superabsorbent projections 108 may be formed from or otherwise include a superabsorbent polymer in the form of granules. The superabsorbent polymer may include Luquasorb 1160 or 1161, such as may be commercially available from BASF. The granules may be contained in a water soluble carrier polymer. One example of the water soluble carrier polymer is polyvinylpyrrolidone (PVP). The superabsorbent polymer of the superabsorbent projections 108 and the water soluble polymer may be formed into a slurry or a suspension using an organic solvent. The organic solvent may include propanone or propanol, and may aid in delivery of the superabsorbent projections 108 to the first side 114 of elastic foam layer 106. In some embodiments, to increase the softness of the superabsorbent granules, a plasticizer may be added to the slurry. In one embodiment, the plasticizer may be water. In some embodiments, the slurry to form the superabsorbent projections 108 may have a formulation of 20 parts by mass of PVP, 10 parts by mass of a superabsorbent polymer, 1 part by mass of glycerol, and 100 parts by mass of propanone. In some embodiments, to plasticize the granules, 1 part to 2 parts by mass of water may be added to the slurry mixture. In other embodiments, a water soluble polymer superabsorbent precursor, such as acrylic acid or 2-acrylamido-2-methyl-propanesulfonic acid (AMPS), with suitable UV curing additives, may replace the superabsorbent polymer. Such a precursor may be a relatively low viscosity solution and can be printed onto elastic foam layer 106 and exposed to UV light to form a soft gel, eliminating the need for a plasticizer. In some embodiments, the water soluble polymer superabsorbent precursor may be similar to that used for preparing hydrogel coatings.

The slurry mixture is applied to first side 114 of elastic foam layer 106 to form superabsorbent projections 108. In some embodiments, the slurry may be applied to elastic foam layer 106 through standard printing methods, such as silk screen printing, gravure printing, or by x-y plotter printing. Superabsorbent projections 108 may be in any non-contiguous shapes such as circles, squares, hexagons, hoops/halos, stars, crosses, a range of lines, or any combination of shapes. Superabsorbent projections 108 may be printed such that they are substantially evenly distributed on first side 114. In other embodiments, superabsorbent projections 108 may be printed in an uneven (e.g. non-uniform, random, etc.) pattern on first side 114. In either embodiment, superabsorbent projections 108 are arranged in a non-contiguous manner (i.e. isolated, separated, spaced-apart, non-touching, etc.) so that a flexible region remains between superabsorbent projections 108 to preserve flexibility of wound dressing 100. In some embodiments, superabsorbent projections 108 may include a flexible plasticized hydrophilic polymer matrix having a substantially continuous internal structure. In some embodiments, After the slurry mixture has dried in the pattern of superabsorbent projections 108, the superabsorbent projections 108 may be printed with an adhesive coated film to allow superabsorbent projections 108 to adhere to second side 112 of drape layer 102. In some embodiments, the adhesive applied to superabsorbent projections 108 is moisture vapor transmitting and/or patterned to allow passage of water vapor there-through. The adhesive may include a continuous moisture vapor transmitting, pressure-sensitive adhesive layer of the type conventionally used for island-type wound dressings (e.g., a polyurethane or polyethylene-based pressure sensitive adhesive). One example of an adhesive which can be used is a pressure sensitive adhesive based on acrylate ester copolymers, polyvinyl ethyl ether and polyurethane, as described in Great Britain Patent Application No. 1280631A. The basis weight of the adhesive may be 20 to 250 $g/m^2$, and more preferably 50 to 150 $g/m^2$. In some embodiments, after the adhesive has been applied to superabsorbent projections 108, a surface head (i.e., an iron) is applied to drape layer 102 such that drape layer 102 bonds to the superabsorbent projections 108

Superabsorbent projections 108, as shown in FIGS. 4-5 are configured to swell upon absorption of fluid 118. Fluid 118 may, for example, be wound exudate fluid from wound bed 120. Superabsorbent projections 108 may be more hydrophilic than elastic foam layer 106, such that superabsorbent projections 108 assist in wicking fluid 118 from the second side of elastic foam layer 106 towards the first side 114 and into the superabsorbent projections 108. Such high hydrophilicity of superabsorbent projections 108 establishes a hydrophilic gradient from the wound bed 120 to the atmosphere surrounding wound dressing 100. Each of the superabsorbent projections 108 may absorb and swell upon absorption of fluid 118, providing a visual indication of which portion of wound bed 120 has absorbed fluid 118. In some embodiments, even upon absorption of fluid 118 each of the superabsorbent projections 108 will remain isolated. In some embodiments, a square wound dressing of the size 100 mm by 100 mm is capable of holding greater than 50 ml of fluid 118. In some embodiments, the inventor's present belief is that after wound dressing 100 has absorbed 50 ml of fluid 118 and is left exposed for a time period of 24 hours, the overall mass of wound dressing 100 is <approximately 50% of the original mass upon full absorption due, at least in part, to evaporation of fluid 118 through drape layer 102.

According to an exemplary embodiment, wound dressing 100 has multiple advantages over previous wound dressings. Wound dressing 100 is both soft and flexible, and is capable of wicking fluid 118 away from wound bed 120 and absorbing fluid 118 over the plurality of non-contiguous superabsorbent projections 108. As the superabsorbent projections 108 are located above elastic foam layer 106, fluid 118 is absorbed at a separate location so as to minimize a level of fluid 118 that remains close to wound bed 120. Further, the non-contiguous superabsorbent projections 108 may be isolated from the edges of wound dressing 100 to reduce the risk of fluid 118 leaking from wound dressing 100.

According to an exemplary embodiment, the superabsorbent polymer in the form of granules has a higher absorption capacity than traditionally used absorbent non-woven dressings and therefore can maintain the same absorption capacity as a traditional dressing with less material required. With less granules and material needed for the superabsorbent projections 108, the overall structure of wound dressing 108 is highly flexible and a thickness of wound dressing 108 may be reduced. Further, the concentration of superabsorbent polymer within the slurry may be increased to increase the absorption capacity of wound dressing 100 to have a high storage and fluid management capacity, or the print pattern and density of superabsorbent projections 108 may be changed to easily adapt the wound dressing 100 for a particular wound. Additionally, the swelling of superabsorbent projections 108 provides a visual indicator as to when wound dressing 100 has reached maximum fluid capacity and when wound dressing 100 needs to be changed.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

What is claimed is:

1. A wound dressing comprising:
    a hydrophilic elastic foam layer configured to engage a wound bed, and having a first side and a second side, the second side configured to face the wound bed;
    a drape layer having a first side and a second side, the second side configured to face the first side of the hydrophilic elastic foam layer; and
    a plurality of superabsorbent projections fixed to and extending from the first side of the hydrophilic elastic foam layer towards the second side of the drape layer, the plurality of superabsorbent projections being non-contiguous, and wherein each superabsorbent projection of the plurality of superabsorbent projections has only one surface in contact with the hydrophilic elastic foam layer.

2. The wound dressing of claim 1, wherein the superabsorbent projections are operable to draw a wound exudate fluid through the hydrophilic elastic foam layer.

3. The wound dressing of claim 2, wherein the drape layer comprises a material having a high moisture vapor transmission rate, and is configured to permit evaporation of the wound exudate fluid from the superabsorbent projections.

4. The wound dressing of claim 3, wherein the ordering of the hydrophilic elastic foam layer, and the superabsorbent projections, and the drape layer, are configured to establish a relative hydrophilic gradient from the wound bed to an ambient atmosphere through the dressing.

5. The wound dressing of claim 4, wherein the superabsorbent projections are configured to swell upon absorbing the wound exudate fluid to provide a visual indication of which portion of the wound dressing is receiving wound exudate and/or when the wound dressing is full.

6. The wound dressing of claim 1, wherein the superabsorbent projections may be formed in a plurality of shapes or patterns comprising circles, squares, hexagons, hoops/halos, stars, crosses, a range of lines, or any combination of said shapes.

7. The wound dressing of claim 1, wherein the drape layer is laminated with fusible fiber to one of the hydrophilic elastic foam layer, or the hydrophilic elastic foam layer and the superabsorbent projections.

8. The wound dressing of claim 1, wherein the superabsorbent projections are printed onto the first side of the hydrophilic elastic foam layer by screen printing, gravure printing, or by x-y plotter printing.

9. The wound dressing of claim 1, wherein the superabsorbent projections comprise a flexible plasticized hydrophilic polymer matrix having a substantially continuous internal structure.

10. The wound dressing of claim 9, wherein the superabsorbent projections comprise a polymer in the form of granules, and the granules are contained in a water soluble carrier polymer such as polyvinylpyrrolidone.

11. The wound dressing of claim 1, wherein the superabsorbent projections are coated with an adhesive film, and the adhesive film is at least one of a polyurethane film or a polyethylene film.

12. The wound dressing of claim 1, wherein the superabsorbent projections are evenly distributed upon at least a portion of the first side of the hydrophilic elastic foam layer.

13. The wound dressing of claim 1, wherein the superabsorbent projections are distributed in a non-uniform pattern on the first side of the hydrophilic elastic foam layer.

14. The wound dressing of claim 1, wherein the hydrophilic elastic foam layer comprises at least one of a polyurethane foam or a polyethylene foam.

15. The wound dressing of claim 1, wherein the plurality of superabsorbent projections forms areas of the hydrophilic elastic foam layer that are free of superabsorbent.

16. The wound dressing of claim 1, wherein the hydrophilic elastic foam layer comprises a substantially flat sheet.

17. The wound dressing of claim 1, wherein the plurality of superabsorbent projections are configured to remain non-contiguous upon absorption of fluid.

\* \* \* \* \*